(12) United States Patent
Amit et al.

(10) Patent No.: US 9,703,795 B2
(45) Date of Patent: *Jul. 11, 2017

(54) REDUCING FRAGMENTATION IN COMPRESSED JOURNAL STORAGE

(71) Applicant: INTERNATIONAL BUSINESS MACHINES CORPORATION, Armonk, NY (US)

(72) Inventors: Jonathan Amit, Omer (IL); Sergey Marenkov, Yehud (IL); Ben Sasson, Yaffo (IL); Ori Shalev, Kiryat Ono (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/074,172

(22) Filed: Nov. 7, 2013

(65) Prior Publication Data

US 2014/0188824 A1 Jul. 3, 2014

Related U.S. Application Data

(63) Continuation of application No. 13/732,514, filed on Jan. 2, 2013.

(51) Int. Cl.
 *G06F 7/00* (2006.01)
 *G06F 17/00* (2006.01)
 *G06F 17/30* (2006.01)
 *G06F 15/16* (2006.01)

(52) U.S. Cl.
 CPC .. *G06F 17/30153* (2013.01); *G06F 17/30191* (2013.01); *G06F 17/30312* (2013.01)

(58) Field of Classification Search
 CPC ............... G06F 17/30153; G06F 17/30312
 USPC .................................................. 707/693, 812
 See application file for complete search history.

(56) References Cited

U.S. PATENT DOCUMENTS

| 6,301,578 | B1* | 10/2001 | Harris | 707/693 |
|---|---|---|---|---|
| 6,816,942 | B2* | 11/2004 | Okada et al. | 711/112 |
| 2006/0112222 | A1* | 5/2006 | Barrall | G06F 3/0689 711/114 |
| 2007/0266037 | A1* | 11/2007 | Terry | G06F 3/0607 707/999.1 |
| 2008/0228795 | A1* | 9/2008 | Lomet | G06F 17/30312 707/999.101 |
| 2009/0182779 | A1* | 7/2009 | Johnson | 707/999.2 |

(Continued)

FOREIGN PATENT DOCUMENTS

WO 2007097581 A1 8/2007

*Primary Examiner* — Usmaan Saeed
*Assistant Examiner* — Brian E. Weinrich
(74) *Attorney, Agent, or Firm* — Griffiths & Seaton PLLC (57) ABSTRACT

While discharging a data chunk the chunk is compressed into a storage block. If the chunk is found to be too large to be able to be completely compressed into the storage block certain characteristics of the data chunk are examined to determine whether or not the data chunk should be split. If the data chunk should be split, a remaining portion of the data chunk is compressed to a storage block that is next in chronological order to the original storage block. If the data chunk should not be split, all of the data chunk is moved to the next chronological storage block while leaving any remaining space in the storage block as unused.

7 Claims, 8 Drawing Sheets

(56) References Cited

U.S. PATENT DOCUMENTS

2010/0318497 A1* 12/2010 Price et al. ................... 707/693
2011/0276548 A1* 11/2011 Koifman ........... G06F 17/30153
                                                             707/693
2013/0212074 A1* 8/2013 Romanski ........... G06F 12/0253
                                                             707/692
2013/0297624 A1   11/2013 Raghunathan et al.

* cited by examiner

REDUCING FRAGMENTATION IN COMPRESSED JOURNAL STORAGE

CROSS REFERENCE TO RELATED APPLICATIONS

This application is a Continuation of U.S. patent application Ser. No. 13/732,514, filed on Jan. 2, 2013.

FIELD OF THE INVENTION

The present invention relates generally to computers, and more particularly, to reducing fragmentation in compressed journal storage in a computing environment.

DESCRIPTION OF THE RELATED ART

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives. These data processing systems typically require a large amount of data storage. Customer data or data generated by users within the data processing system, occupies a great portion of this data storage. Many of these computer systems include virtual storage components. Data compression is widely used to reduce the amount of data required to process, transmit, or store a given quantity of information. Data compression is the coding of data to minimize its representation. Compression can be used, for example, to reduce the storage requirements for files, to increase the communication rate over a channel, or to reduce redundancy prior to encryption for greater security. However, data compression consumes a significant amount of computing (e.g. central processing unit "CPU") resources. Also, data can be lost due to problems such as system crashes, hardware failures, and abnormal computing system halts. Journaled file systems can be used to maintain data integrity when these types of problems occur.

SUMMARY OF THE DESCRIBED EMBODIMENTS

In one embodiment, a method is provided for reducing fragmentation in compressed journal storage using a processor device in a computing environment. A data chunk is compressed into a storage block when emitting the data chunk. If the data chunk is unable to be completely compressed into the storage block, attributes of the data chunk are analyzed for determining whether the data chunk should be split. If the data chunk should be split, a remaining portion of the data chunk is compressed to a next chronological storage block. If the data chunk should not be split, all of the data chunk is moved to the next chronological storage block while leaving any remaining space in the storage block as unused.

In another embodiment, a computer system is provided for reducing fragmentation in compressed journal storage using a processor device in a computing environment. The computer system includes a computer-readable medium and a processor in operable communication with the computer-readable medium. A data chunk is compressed into a storage block when emitting the data chunk. If the data chunk is unable to be completely compressed into the storage block, the processor device analyzes attributes of the data chunk for determining whether the data chunk should be split. If the data chunk should be split, a remaining portion of the data chunk is compressed to a next chronological storage block. If the data chunk should not be split, all of the data chunk is moved to the next chronological storage block while leaving any remaining space in the storage block as unused.

In a further embodiment, a computer program product is provided for reducing fragmentation in compressed journal storage by a processor device in a computing environment. The computer-readable storage medium has computer-readable program code portions stored thereon. The computer-readable program code portions include a first executable portion that compresses a data chunk into a storage block when emitting the data chunk. If the data chunk is unable to be completely compressed into the storage block, attributes of the data chunk are analyzed for determining whether the data chunk should be split. If the data chunk should be split, a remaining portion of the data chunk is compressed to a next chronological storage block. If the data chunk should not be split, all of the data chunk is moved to the next chronological storage block while leaving any remaining space in the storage block as unused.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF CERTAIN EMBODIMENTS

In a data processing system or computing environment, a journaling (e.g., a block) storage system may be used to store the write operations in a journal. In a compressed journal system the journal holds compressed data. Journaled systems maintain file system integrity by recording information regarding updates to directories, bitmaps, and/or data, in a log, also called a journal, before the updates are written to a storage device such as a hard disk. In the event of a system crash or other problem, the information in the journal may be used to restore the file system to a consistent state. Full journaling systems additionally perform data journaling, in which data updates are also stored in the journal, to ensure that no committed data is lost. The ability to access the data randomly is accomplished by dividing the journal into blocks that use a separate dictionary. If an overwrite operation is performed, the overwrite operation of the data invalidates an old record and creates a hole in the journal.

Journal storage may be characterized by the write pattern of the journal storage. Data chunks are stored in the order they were written at, so a logical offset of the data chunk has little or no relation to the physical location of the data chunk on the storage backend. Each data chunk is stored following the previous data chunk and invalidates any earlier data chunks written to same logical area.

In compressed journal storage, each data chunk is compressed prior to being written, and since the compression process by definition does not preserve the data size, the size of the compressed data chunk is unknown prior to the compression. Because of unknown size, multiple compressed data chunks (probably of different sizes) are written into a single fixed-size physical block. Each block may be considered as used while the fixed-size physical block contains at least one valid data chunk. As used herein, fragmentation may be defined by an event where a logical consecutive area is split into several non-consecutive data chunks on a storage backend. Since the area is seen as consecutive (e.g., seen by a user), the area is likely to be read as a whole. However, fragmentation causes multiple input/output's (I/O) to a storage backend to serve a single user I/O. This obviously increases latency for the I/O. Fragmentation has greater impact on compressed volumes, because another step of decompression is required when retrieving each data chunk. Thus, in addition to increasing the storage backend I/O count, fragmentation increases CPU usage on storage. To increase space utilization, a garbage collection process may be performed on low-utilization physical blocks. Essentially, the garbage collection reads the valid data chunks of a block, and then writes the same data again, which invalidates the data chunks of the source block and it is returned to free blocks pool to be reused later on. Garbage collection could result in fragmenting some of the data chunks contained in the source block. It should be noted that this could happen indefinitely and re-fragment data chunks over and over again.

In order to increase the efficiency and productivity, in one embodiment, the present invention provides a solution for reducing fragmentation in compressed journal storage using a processor device in a computing environment. A data chunk is compressed into a storage block when emitting the data chunk. If the data chunk is unable to be completely compressed into the storage block, attributes of the data chunk are analyzed for determining whether the data chunk should be split. If the data chunk should be split, a remaining portion of the data chunk is compressed to a next chronological storage block. If the data chunk should not be split, all of the data chunk is moved to the next chronological storage block while leaving any remaining space in the storage block as unused. Thus, the present invention dramatically decreases fragmentation in compressed journal storage by changing the way garbage collection is performed on compressed journal storage. The new garbage collection avoids constant fragmentation of data chunks while keeping space wastage to minimum.

As described herein, a data chunk may be a single continuous data region, emitted atomically. A user data chunk may be a data chunk emitted by a user (externally). An internal data chunk may be a data chunk emitted internally, e.g. by defragmentation process. A split may be a single logical data chunk, which for space utilization reasons, is divided into two different physical blocks. A hole may be an unused space at the end of a physical block, which cannot be used to store data until an entire block is freed.

Figure 1:
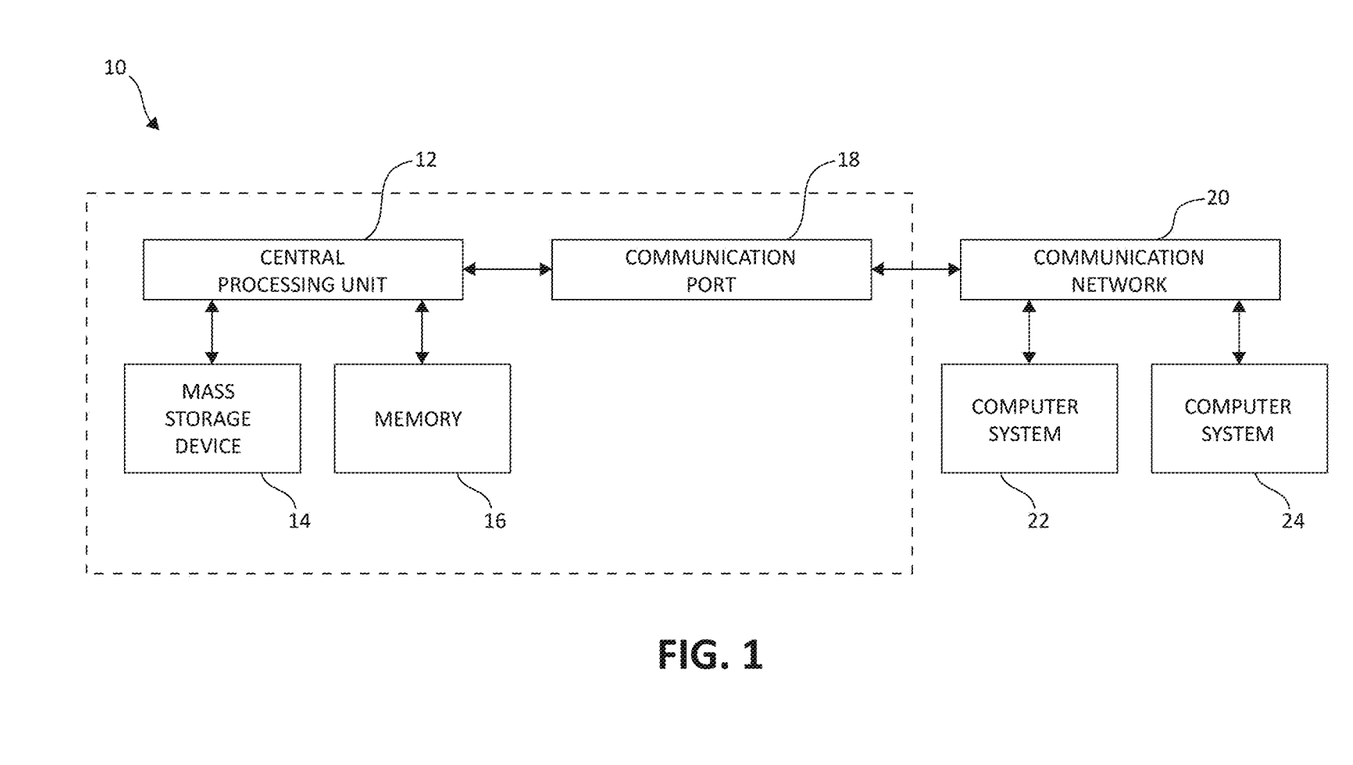
FIG. 1 is a block diagram illustrating a computer storage environment having an exemplary storage device in which aspects of the present invention may be realized.

Turning to FIG. 1, an example computer system 10 is depicted in which aspects of the present invention may be realized. Computer system 10 includes central processing unit (CPU) 12, which is connected to mass storage device(s) 14 and memory device 16. Mass storage devices may include hard disk drive (HDD) devices, which may be configured in a redundant array of independent disks (RAID). The garbage collection operations further described may be executed on device(s) 14, located in system 10 or elsewhere. Memory device 16 may include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24. The computer system 10 may include one or more processor devices (e.g., CPU 12) and additional memory devices 16 for each individual component of the computer system 10 to execute and perform each operation described herein to accomplish the purposes of the present invention.

Figure 2:
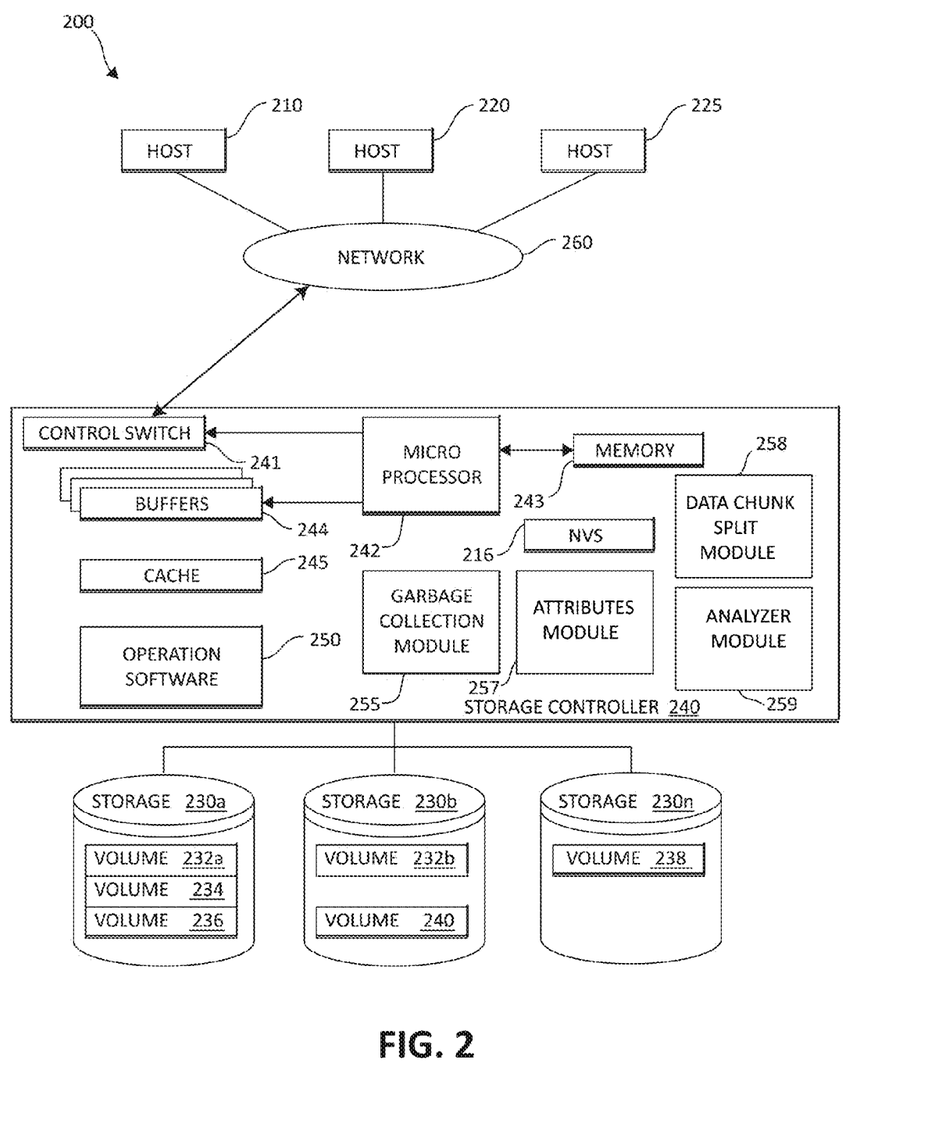
FIG. 2 is a block diagram illustrating a hardware structure of an exemplary data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over Ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controller 240 and storage 230.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores the operation software 250, program instructions and data, which the processor 242 may access for executing functions and method steps associated with managing storage 230, and executing the steps and methods of the present invention. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also be referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a garbage collection module 255, an attributes module 257, a data chunk split module 258, and an analyzer module 259 to assist with garbage collection in a compressed journal file system. The garbage collection module 255, the attributes module 257, the data chunk split module 258, and the analyzer module 259 may work in conjunction with each and every component of the storage controller 240, the hosts 210, 220, 225, and storage devices 230. Both the garbage collection module 255, the attributes module 257, the data chunk split module 258, and the analyzer module 259 may be structurally one complete module or may be associated and/or included with other individual modules. The garbage collection module 255, the attributes module 257, the data chunk split module 258, and the analyzer module 259 may also be located in the cache 245 or other components of the storage controller 240 to accomplish the purposes of the present invention.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control and each table described later, cache 245 for temporarily storing (buffering) data, and buffers 244 for assisting the cache 245 to read and write data, a control switch 241 for controlling a protocol to control data transfer to or from the storage devices 230, and garbage collection module 255, the attributes module 257, the data chunk split module 258, and the analyzer module 259 in which information may be set. Multiple buffers 244 may be implemented with the present invention to assist with garbage collection in a compressed journal file system as described herein.

In one embodiment, the host computers or one or more physical or virtual devices, 210, 220, 225 and the storage controller 240 are connected through a network adaptor (this could be a fibre channel) 260 as an interface i.e., via a switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, and garbage collection module 255, the attributes module 257, the data chunk split module 258, and the analyzer module 259 are in communication with each other and may be separate or one individual component(s). Also, several, if not all of the components, such as the operation software 245 may be included with the memory 243 for performing garbage collection in a compressed journal file system. Each of the components within the devices shown may be linked together and may be in communication with each other for purposes suited to the present invention.

Figure 3:
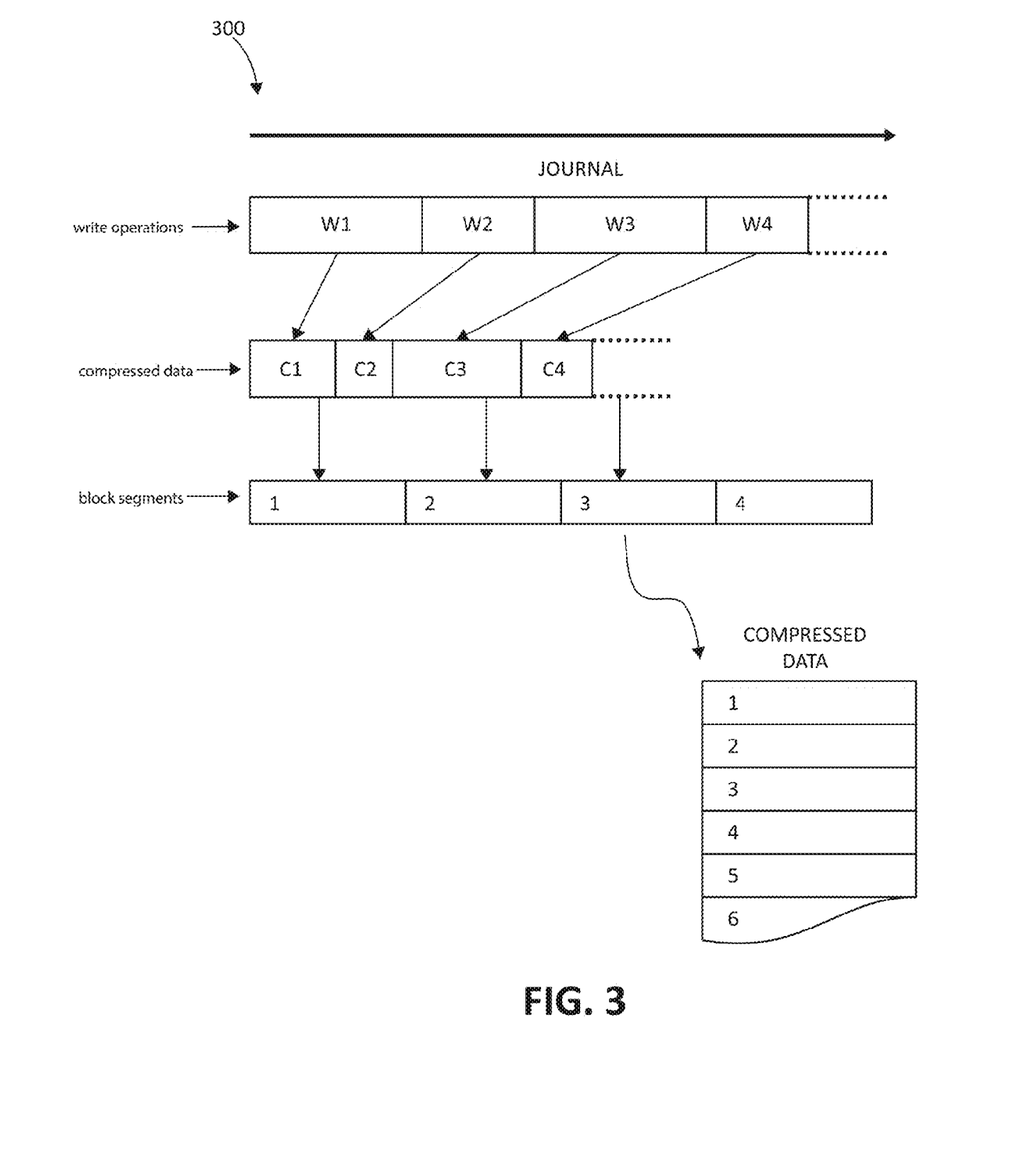
FIG. 3 is a block diagram illustrating a compressed journal file system in which aspects of the present invention may be realized.

FIG. 3 illustrates an exemplary block diagram 300 showing a compressed journal file system. In a data processing system, a journaling file system may be used to store the write operations in a journal, as shown by W1, W2, W3, and W4. The data is compressed as C1, C2, C3, and C4, which may then be stored in block segments 1, 2, 3, and 4. The ability to access the data randomly is done by dividing the journal into blocks that uses a separate dictionary. When an overwrite operation is performed, the overwrite operation of the data invalidates an old record and creates a hole in the journal, as illustrated by the compressed data block's 1 through 6. Block 6 depicts an overwrite operation of data invalidating an old record and creating a hole in the journal.

Figure 4:
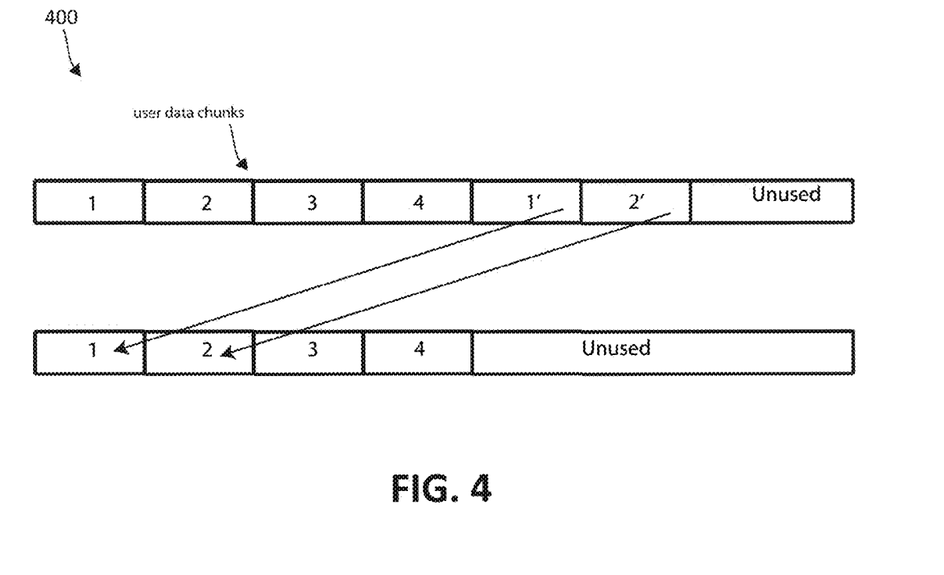
FIG. 4 is a block diagram illustrating a compressed journaling defragmentation in which aspects of the present invention may be realized.

FIG. 4 illustrates an exemplary block diagram 400 showing a journaling defragmentation. As mentioned previously, in journaling devices, user data chunks (labeled in FIG. 4 as 1, 2, 3, 4, 1', 2') are written one after another. Chunks 1' and 2' override chunks 1 and 2 respectively. Overriding data chunks accumulate and invalidate previous data chunks for the same region, while not actually erasing the data. This obviously causes loss of space since all previous writes are kept. When sufficient space is invalidated, defragmentation can take place and move data from the end of the device to a location close to its beginning, thus reducing wastage of space.

Figure 5:
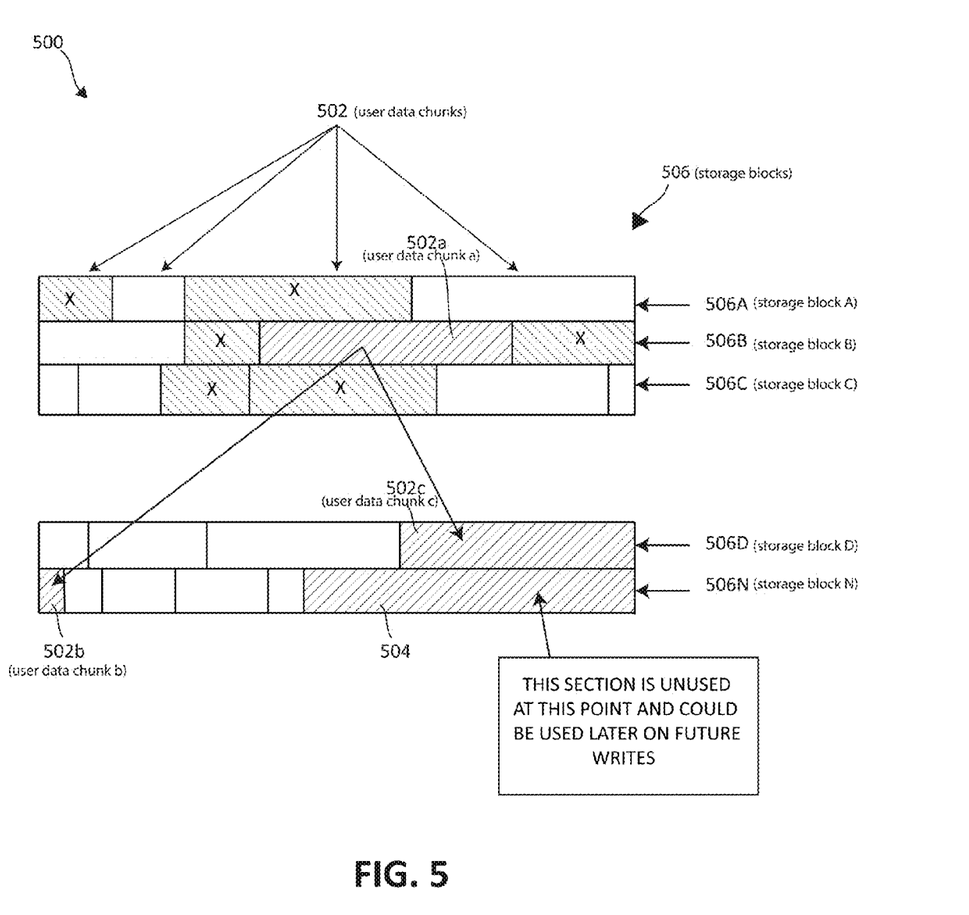
FIG. 5 is a block diagram illustrating a compressed journaling defragmentation.

Since the user write size of the data chunk after compression is unknown prior to the data chunk being compressed, compressed user data chunks of different sizes are spread over the fixed size physical blocks, occasionally split between blocks. A block cannot be reused until all the user data chunks the block contains are invalidated, so a process of overriding only some of the data chunks in a single physical block will render bad compression ratio until a defragmentation process will take place and free the partially used blocks. Defragmentation is an internal process, and is likely to split a single user data chunk into two internal data chunks due to the nature of compression process as described in FIG. 5. FIG. 5 illustrates an exemplary block diagram 500 showing a compressed journaling defragmentation. The compressed journaling defragmentation process, as illustrated in FIG. 5, despite improving a compression ratio, may cause several problems. Illustrated in FIG. 5 are individual user data chunks 502 which are housed and included in a storage block 506 (the storage blocks are illustrated with 5 separate horizontal lines labeled as 506A-N). For illustration purposes, four arrows are pointing from the user data chunks 502 to the storage block 506A, and each storage block 506A-N contain individual user data chunks 502, but the user data chunks 502 are not labeled in lines 506B-N). Each of the storage blocks 506 may contain user chunks 502 of various sizes. For example, storage block line 506A contains 4 separate user chunks 502 with two of the user chunks 502 illustrated in the diagram with an "X" symbol and the other two user chunks 502 not having an "X" symbol or with a pattern are being "clear" or empty. As indicated in the user data chunks 502 without an "X" symbol or with a pattern (e.g., diagonal lines) contained therein, the empty "clear" user data chunks 502 are valid compressed data that has not been invalidated as of yet. The user data chunks 502 containing the "X" symbol contain compressed chunks that have been invalided by a subsequent write operation.

The user data chunk 502a, previously stored on the single physical location 502a, is now split into two different physical locations 502b and 502c, which will increase user latency when attempting to fetch it. The breaking of data chunks 502 causes an increased size of internal data structure used to hold the mapping of logical offsets to the data chunks 502 physical locations. This process is iterative, so for a user write, which was already split on a previous iteration, could be split again, resulting in an amplification of the above stated issues. As seen in the physical location 504, this section is unused at that this point in time but could be used later on future write operations. This is because the physical location 504 is the part of the block that is yet to be filled with future compressed data. This is not a hole because the block is still the "writing head" of the journaling process. In one embodiment, FIG. 5 illustrates the process of leaving a hole in the current storage block (the non-splitting) and not trying to fill the storage block up with part of the compressed data, so the data has to be compressed and put in one piece in the next chronological block.

Thus, the present invention provides a solution to increase the efficiency and productivity in a journaling environment for reducing fragmentation in compressed journal storage. Thus, the present invention provides a hybrid solution if the data chunk is unable to be completely compressed into the storage block when emitting the data chunk. The hybrid solution includes: during a compression of a data chunk into a storage block when emitting the data chunk, if the data chunk is unable to be completely compressed into the storage block, attributes of the data chunk are analyzed for determining whether the data chunk should be split. If the data chunk is unable to be completely compressed into the storage block and 1) the data chunk should be split based on analyzing the attributes of the data chunk, a remaining portion of the data chunk is compressed to a next chronological storage block, or 2) if the data chunk should not be split, the entire data chunk is moved to the next chronological storage block while leaving any remaining space in the storage block as unused. The hybrid solutions are described in greater detail, below, in FIGS. 6 and 7. In one embodiment, when emitting a data chunk, the data chunk is compressed into a physical block (e.g., a fixed sized storage block). If the compressed data chunk does not fit into block, the data chunk's attributes are checked and analyzed for determining whether the data chunk should or should not be split. In case the data chunk should be split, the remaining uncompressed data chunk is compressed to a next chronological block. If the data chunk is not to be split, the data chunk is moved as a whole to the next block, and any remaining space in the now-previous block is left unused. The decision on whether to split a data chunk can be affected by the following attributes. 1) The nature of the process emitting the write operation (e.g., a user originated data chunk in contrast to a defragmentation operation or other internal processes). 2) A remaining hole size. 3) The size of a remaining data chunk. 4) A ratio between the two split pieces (e.g., two split data chunks). 5) The total size of holes in the entire volume/system. 6) Average compression ratio in the volume/system. 7) A compression ratio in a specific compressed data block.

Figure 6:
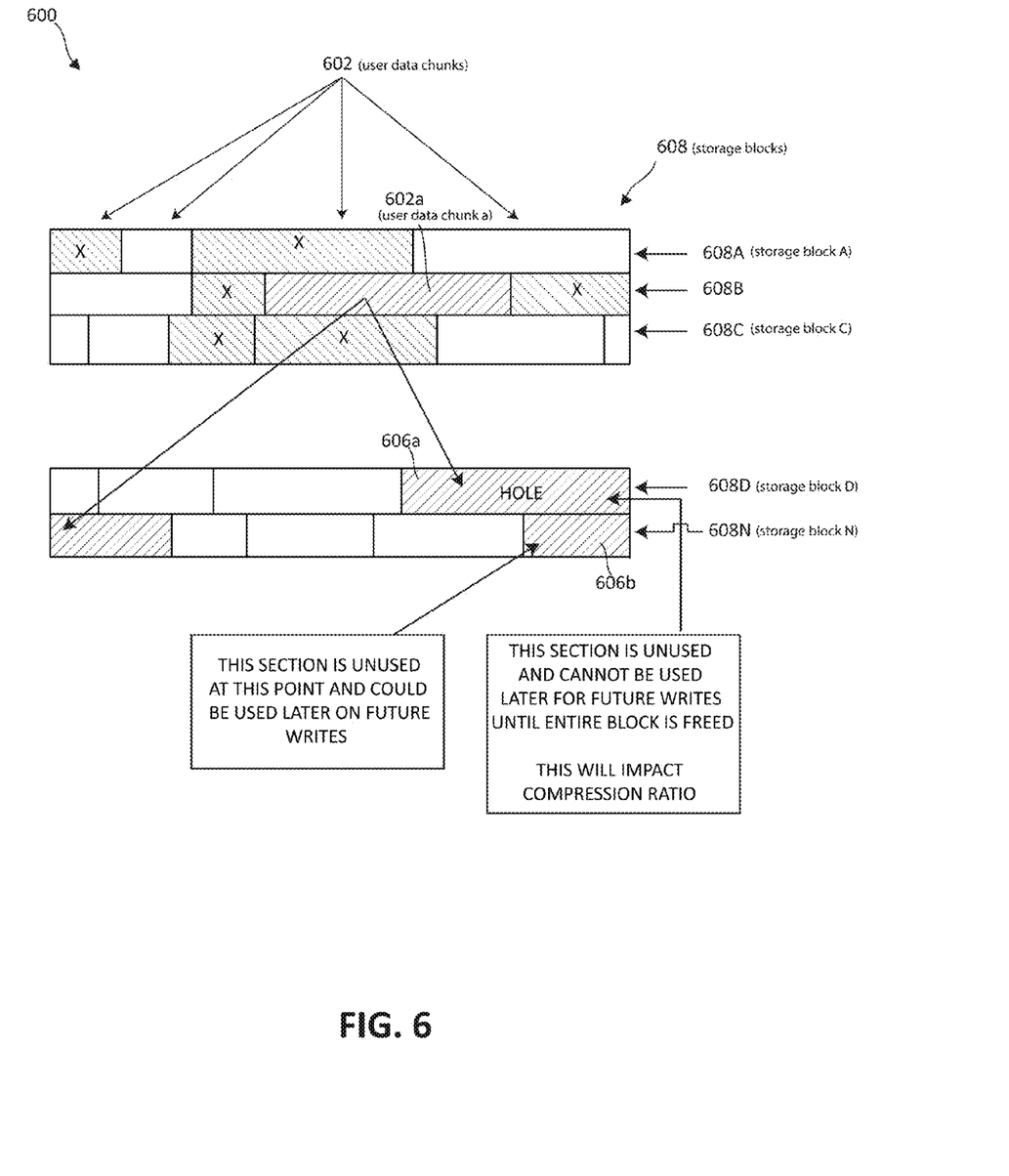
FIG. 6 is a block diagram illustrating a compressed journaling defragmentation without splitting of data chunks.

FIG. 6 illustrates an exemplary block diagram 600 showing a compressed journaling defragmentation without splitting of data chunks. Illustrated in FIG. 6 are individual user data chunks 602 which are housed and included in a storage block 606 (the storage blocks are illustrated with 5 separate horizontal lines labeled as 608A-N). Four arrows are pointing from the user data chunks 602 to the storage block 608a, and each storage block 608A-N contain individual user data chunks 602, but the user data chunks 602 are not labeled in lines 608B-N). The storage blocks 608 each contain user chunks 602 of various sizes. For example, storage block line 608A contains 4 separate user chunks 602 with two of the user chunks 602 not having an "X" symbol or with a pattern are "clear" or empty. As indicated in the user data chunks 602 without an "X" symbol or with a pattern (e.g., diagonal lines) contained therein, the empty "clear" user data chunks 602 are valid compressed data that has not been invalidated as of yet. The user data chunks 602 containing the "X" symbol contain compressed chunks that have been invalided by a subsequent write operation. In one embodiment, if the data chunk 602 is unable to be completely compressed into the storage block when emitting the data chunks, and analyzed attributes of the data chunk determine the data chunk should not be split, the entire data chunk (e.g., 602a) is moved to the next chronological storage block (e.g., shown with one of the arrows) while leaving any remaining space in the storage block as unused 606a, shown with the other arrow. As seen in the physical location 606a (labeled as a "hole"), this section is unused at that this point and could not be used later on future writes and this will impact a compression ratio. However, 606b is also unused at this point and may be used later on future writes. It should be noted that there is always one current active block (e.g., storage block). Once a decision is made to move to the next storage block, it is not possible to go back and use the physical location 606a. The storage block 608N at the bottom is the current block, so 606b is still a potential space to hold new compressed data.

Figure 7:
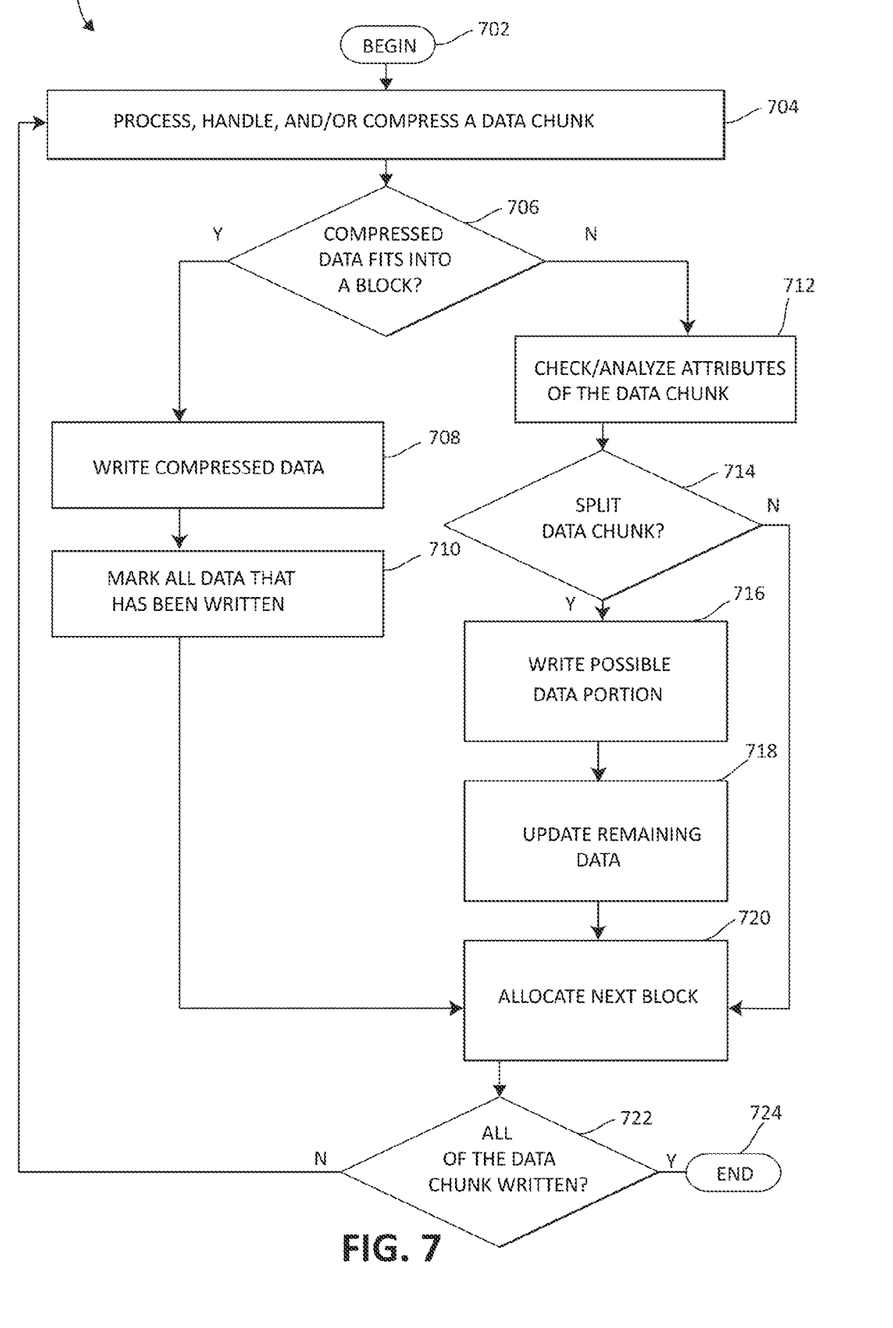
FIG. 7 is a flowchart illustrating an exemplary method for compressed journaling while reducing fragmentation.

FIG. 7 is a flowchart illustrating an exemplary method 700 for compressed journaling while reducing fragmentation. The method 700 begins (step 702), by handling/processing a data chunk and compresses a data chunk (e.g., compresses a remaining data chunk) (step 704). It should be noted that the data chunks may be slit and or not split. The method 700 then determines if the compressed data fits entirely within a storage block during a compression of a data chunk into a storage block when emitting the data chunk (step 706). If yes, the method 700 writes the compressed data (step 708) and marks all data as having been written (step 710). The method 700 then allocates a next storage block (e.g., the next chronological storage block) (step 720). If the compressed data does not fit entirely within a storage block, the method 700 checks/analyzed the data chunks attributes (step 712). Based upon the attributes of the data chunk, the method 700 determines if the data chunk should be split (step 714). If yes, any possible data portion is written (step 716) and the remaining data is updated (step 718). The method 700 then allocates a next storage block (e.g., the next chronological storage block) (step 720). If the data chunk should not be split, the method 700 jumps right to step 720 and allocates a next storage block (e.g., the next chronological storage block) (step 720). The method 700 then determines if the entire data chunk has been writing (step 720). If no, the method 700 returns to step 704. If yes, the method 700 ends (step 722).

Figure 8:
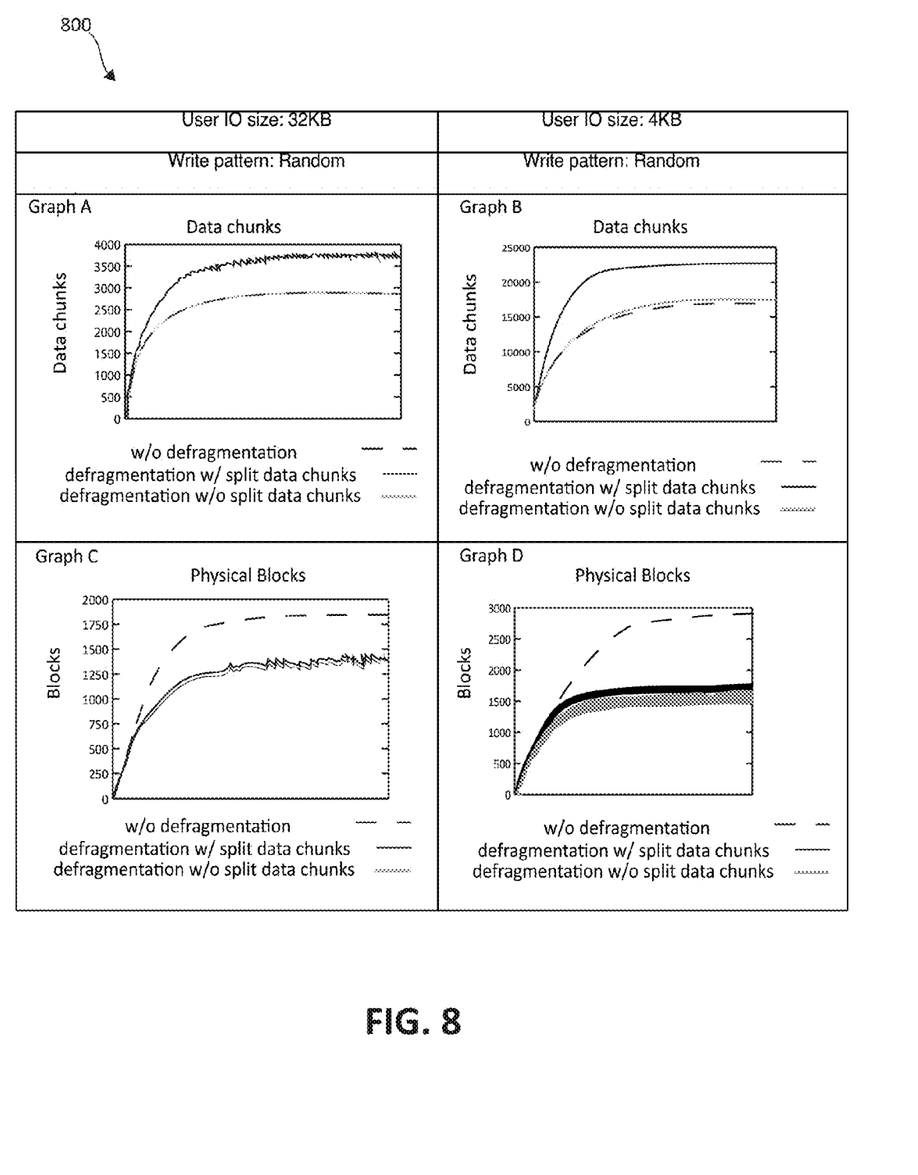
FIG. 8 is an exemplary graph diagram illustrating results of a journaling defragmentation in which aspects of the present invention may be realized.

Turning now to FIG. 8, an exemplary graph diagram 800 showing results of a journaling defragmentation, in which aspects of the present invention may be realized, is illustrated. For graph A and C, a user input/output (I/O) size is 32 KB for random write patterns. For graph B and D, user input/output (I/O) size is 8 KB for random write patterns. In graph A and graph B, the Y-axis illustrates the amount of data chunks, with graph A ranging from 0 to 4000 and graph B ranging from 0 to 25,000. In graph C and graph D, the Y-axis illustrates the number of physical blocks, with graph A ranging from 0 to 1600 and graph B ranging from 0 to 3,000. In each of the graphs (A-D), the X-axis represents and illustrates for the random write patterns the results journaling defragmentation 1) without defragmentation, 2) defragmentation with splitting of the data chunks, and 3) defragmentation without splitting the data chunks. It may seem at first that the impact on compression ratio is intolerable, but as can be seen from numerical simulations the impact on compression ratio is negligible while the overall improvement in system performance can be easily noticed. As illustrated in graphs C and D, since the amount of data emitted by a user is the same, fewer physical blocks used means better compression ratio. By keeping data chunks intact while performing internal processes such as defragmentation holds great value in system responsiveness while has very little impact on compression ratio in the long run. Graphs A and B illustrate the amount of data chunks required by the system to describe the same amount of user data. Fewer data chunks that are required decreases the amount of separate I/O's required to serve a single user I/O and reduces the size of internal data structures and reduces the application memory footprint.

In one embodiment, by way of example only, the measurements used in FIG. 8 are based on the following. For data chunks, the total number of data chunks in the system is used. Reducing total number of data chunks for a given data set is obviously an improvement since fewer chunks should be retrieved to serve a single read request. For the Physical blocks, the total number of physical blocks used by the system is included in FIG. 8, where a decrease in the total number of physical blocks means more compact, and therefore a more compressed system. For defragmentation actions, since the physical layout of the data chunks is strongly affected by the algorithm of selecting where to put each data chunk, and in turn affects it back, it can be clearly seen proper split conditions can greatly reduce the number of future defragmentation actions. The algorithm of selecting where to put each data chunk and the decision to split or not to split affects the layout of the data on the storage physical backend. Since the physical layout affects the defragmentation process (holes, compactness of data, etc.) and defragmentation is basically moving data chunks from one place to another (thus effectively selecting where to put them), it is clear that both algorithms affect each other. This can be seen by graph A, where without splitting have a nice, clean line in contrast of the serrated pattern of with splitting. Also, there are several common scenarios and these scenarios (each of the graphs as seen in FIG. 8 for illustration purposes) share several attributes: 1) Physical block size is 32 KB, 2) Compression ratio is 65% (common block device compression ratio), 3) Region size is 64 MB, and 4) and the amount of written data is enough to override region 10 times (640 MB).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for reducing fragmentation in compressed journal storage by a processor device in a computing environment, the method comprising:
in the compressed journal storage in which a user write size of a data chunk is unknown before compression, during the compression of the data chunk of a plurality of various sized compressed data blocks into a fixed size storage block when emitting the data chunk, and when the data chunk is unable to be completely compressed into the storage block after attempting to completely compress the data chunk into the storage block:
analyzing a plurality of attributes of the data chunk, including whether a compressed journaling fragmentation process or a user initiated process emitted the data chunk, a remaining hole size, a size of the remaining data chunk, a ratio between two split pieces of the data chunk, a total size of holes in a storage system, an average compression ratio in the storage system, and a compression ratio in the storage block containing compressed data, for determining whether the data chunk should be split, wherein:
when the data chunk should be split, any possible remaining portion of the data chunk is compressed to a next chronological storage block, and
when the data chunk should not be split, all of the data chunk is moved to the next chronological storage block while any remaining space in the storage block is left as unused.

2. The method of claim 1, further including, during one of an update operation and a garbage collection operation on the storage block, performing one of:
- preventing a splitting of the data chunks thereby leaving holes in the storage block, and
- splitting the data chunks and placing the split data chunks into chronological storage blocks.

3. The method of claim 1, further including preventing a first unused portion of the storage block from being used for write operations until the entire portion of the storage block is freed.

4. The method of claim 1, further including configuring a second unused portion of the storage block to be used for write operations.

5. The method of claim 1, further including, performing one of:
- writing a portion of the data chunk, and
- updating the remaining portion of the data chunk.

6. The method of claim 1, further including, if the data chunk is unable to be completely compressed into the storage block, performing one of:
- writing a portion of the data chunk, and
- updating the remaining portion of the data chunk.

7. The method of claim 1, further including allocating the next chronological storage block.

* * * * *